United States Patent [19]
Dehn

[11] 3,883,020
[45] May 13, 1975

[54] REMOVABLE TRUCK-MOUNTED IMPLEMENT CARRYING FRAME AND METHOD OF LOADING AND UNLOADING SAME

[76] Inventor: Freddie H. Dehn, 69 Highway, Excelsior Springs, Mo. 64024

[22] Filed: Jan. 28, 1974

[21] Appl. No.: 437,345

[52] U.S. Cl. ............ 214/515; 296/35 A; 214/86 A; 298/1 A; 298/17 R; 224/43.03 A
[51] Int. Cl. ............................................. B60p 1/64
[58] Field of Search... 214/515, 512, 38 BA, 38 BB, 214/86 A; 296/35 A

[56] References Cited
UNITED STATES PATENTS

| | | | |
|---|---|---|---|
| 2,565,820 | 8/1951 | Machanic | 214/515 X |
| 2,676,720 | 4/1954 | Noble | 214/515 |
| 2,841,438 | 7/1958 | Weil | 214/515 UX |
| 3,409,154 | 11/1968 | Rasmussen | 214/515 |
| 3,770,149 | 11/1973 | Aquila | 214/86 A |
| 3,817,413 | 6/1974 | Ham | 214/515 |

FOREIGN PATENTS OR APPLICATIONS

| | | | |
|---|---|---|---|
| 93,476 | 2/1960 | Netherlands | 214/515 |
| 1,516,897 | 2/1968 | France | 214/515 |
| 1,800,752 | 6/1970 | Germany | 214/515 |
| 1,902,346 | 9/1969 | Germany | 214/515 |

*Primary Examiner*—Leo Friaglia
*Attorney, Agent, or Firm*—Lowe, Kokjer, Kircher, Wharton & Bowman

[57] ABSTRACT

A framework for converting a "pick-up" truck into a variety of other utility vehicles is provided by the present invention. The invention also encompasses methods of loading and unloading the framework onto the vehicle. The framework is adapted to be coupled with a utility implement such as a wrecker rig, dump bed or other item. The framework is designed so as not to interfere with the normal cargo-carrying capacity of the truck bed once the framework is removed. The framework comprises a generally polygonal base frame having rollers along its leading edge to facilitate movement over the truck bed. First stanchion means comprising first and second spaced apart legs are disposed toward the forward end of the base frame and are pivotally coupled therewith. Each leg has a wheel disposed for surface engagement and when the vehicle moves against the legs they will pivot into their folded position on the truck bed. Second stanchion means comprising first and second spaced apart legs are located toward the opposite end of the frame from the first stanchion means. These legs are normally disposed in a vertical position to support the frame as they are rigidly coupled with it. The legs may be unlocked, however, to allow them to assume a position extending outwardly away from the frame to thereby lower it onto the truck bed. This occurs when the vehicle is moved in the direction opposite the second stanchion means. To unload the frame and support it on the two stanchion means the vehicle is moved in the direction opposite to which it is moved when loading the frame.

17 Claims, 9 Drawing Figures

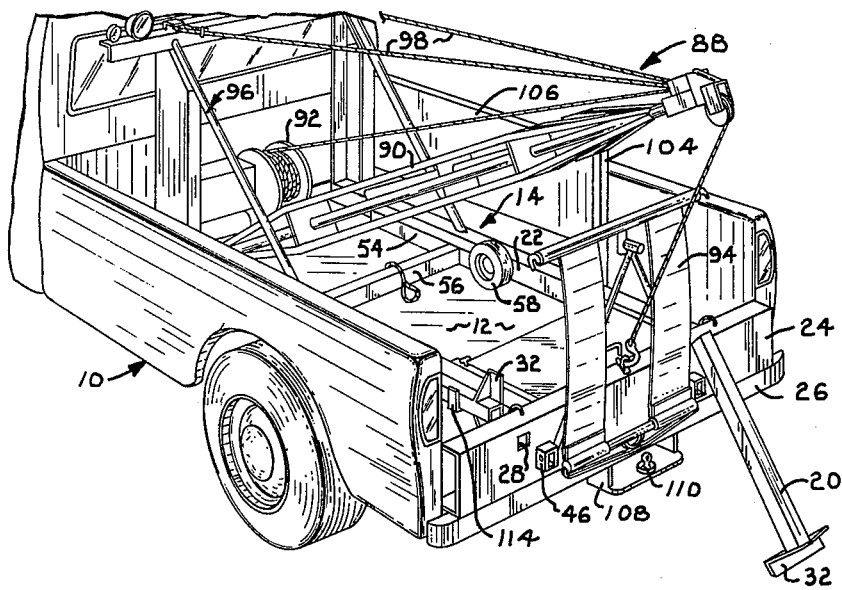
Fig. 1.
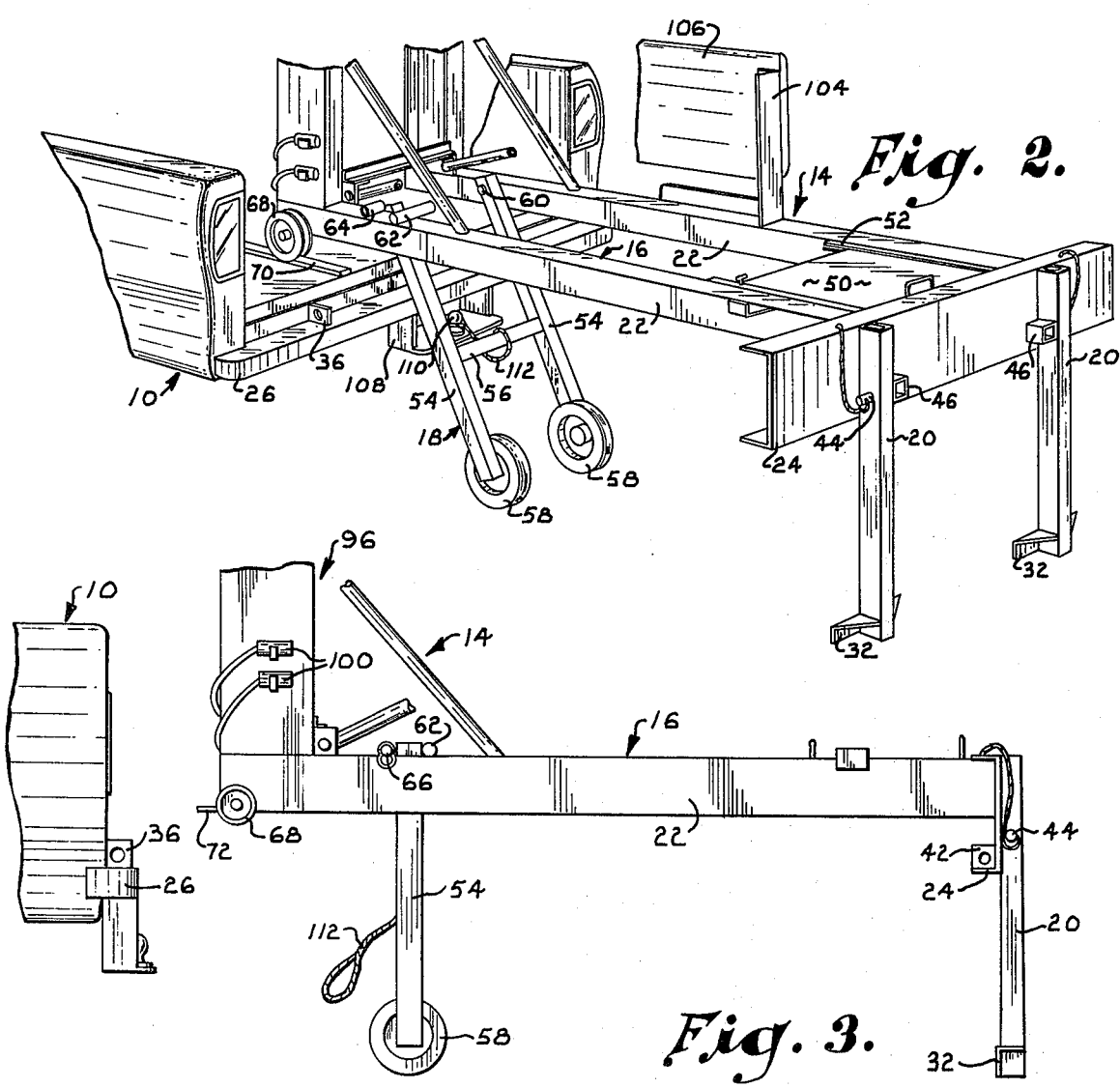
Fig. 2.
Fig. 3.

REMOVABLE TRUCK-MOUNTED IMPLEMENT CARRYING FRAME AND METHOD OF LOADING AND UNLOADING SAME

This invention relates generally to utility vehicles and, more specifically, to apparatus for converting a flat bed truck type vehicle into an implement carrying vehicle without permanently interfering with the cargo-carrying function of the vehicle.

With ever-increasing emphasis on fuel economy and raw material conservation, it is important to avoid duplication of vehicles wherever possible. In many types of businesses a flat bed truck type vehicle is needed for carrying cargo. At times there may be an additional need for a truck mounted implement such as a wrecker rig or dump bed. While others have proposed implements for use in truck beds where the implements are removable when not in use, these prior art devices have generally required special modifications of the truck bed so as to interfere noticeably with the cargo-carrying capacity of the vehicle. Still another disadvantage of the prior art devices has been the general requirement that special tools and equipment be available for unloading a removable implement from a truck bed when the implement is not to be used. This greatly limits the versatility of the vehicles since the implement can only be unloaded where the specially required equipment is available.

It is therefore an object of the present invention to provide an implement carrying framework adapted to be moved in and out of a truck type vehicle which framework is suitable for use with different types of implements.

Another object of the invention is to provide an implement carrying framework which can be moved in and out of a truck type vehicle by a single operator.

It is also an object of this invention to provide an implement carrying framework for a truck type vehicle which can be removed and stored at any location without requiring special equipment other than what is self-contained by the framework itself.

It is also an aim of the present invention to provide a framework as described in the foregoing objects which is completely self supporting when unloaded from the vehicle on which it is disposed.

A very important objective of the invention is to provide an implement-carrying framework adapted to be moved in and out of a truck type vehicle which does not interfere with the cargo-carrying function of the vehicle once removed.

Still another aim of the invention is to provide a method of loading and unloading a framework as described in the foregoing objects onto and off of a truck type vehicle.

Other objects of the invention will be made clear or become apparent from the following description and claims when read in conjunction with the accompanying drawing wherein:

FIG. 1 is a perspective view of a truck type vehicle with the framework of the present invention disposed thereon with an implement included on the framework;

FIG. 2 is an enlarged, fragmentary, perspective view of the apparatus shown in FIG. 1 as it is removed from the bed of the truck type vehicle;

FIG. 3 is a side elevational view, similar to FIG. 2, and showing the framework of the present invention completely removed from the bed of the vehicle and supported in a vertically raised position ready for remounting on a truck;

Figure 4:
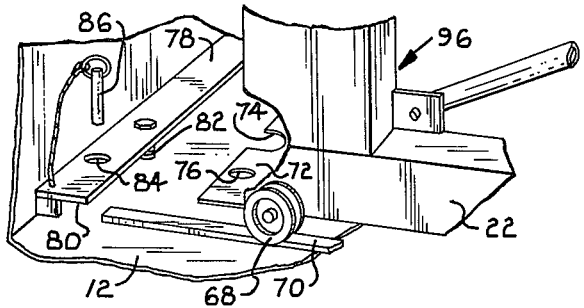
FIG. 4 is an enlarged, fragmentary, perspective view of the forward end of the framework illustrating details of the structure for securing the front end of the framework to the vehicle bed.

Referring initially to FIG. 1, a "pick-up" truck type vehicle is designated generally by the numeral 10 and includes a flat bed 12 normally used for carrying some type of cargo. Shown disposed in the bed 12 in FIG. 1 is a framework designated generally by the numeral 14.

Referring additionally to FIG. 2, it is seen that framework 14 comprises a base frame 16 and first stanchion means 18 disposed toward the forward end of the base frame 16. The framework also includes second stanchion means in the form of legs 20 disposed toward the rear of frame 16.

The base frame 16 comprises spaced apart longitudinally extending members 22 preferably formed from channel stock and extending substantially the length of the truck bed 12. One side of base frame 16 is formed from a channel-shaped section 24 which is rigidly coupled with the two members 22 and is designed to rest upon rear bumper 26 of vehicle 10. Thus, when the framework is disposed on bed 12, section 24 will be in alignment with the rear end of the vehicle.

Figure 5:
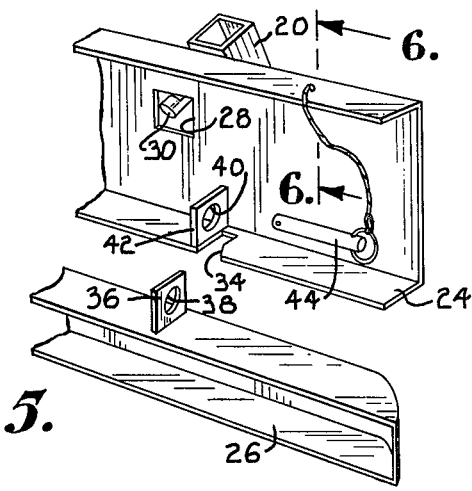
FIG. 5 is an enlarged, fragmentary, perspective view of the rear end of the framework illustrating the structure for securing this end to the rear bumper of the vehicle.
Figure 6:
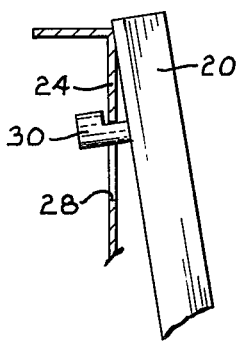
FIG. 6 is a vertical cross-sectional view taken along lines 6—6 of FIG. 5 and illustrating the stanchion means which supports one end of the framework and its complemental component at one side of the framework.
Figure 7:
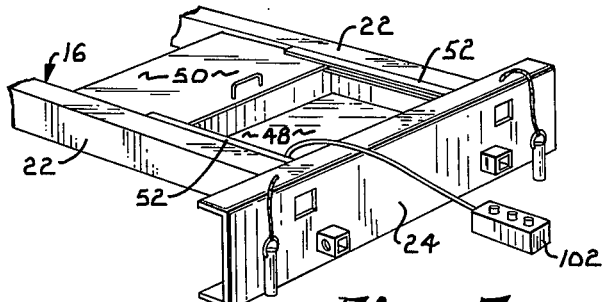
FIG. 7 is a fragmentary perspective view of the rear end of the framework illustrating the location of a built-in tool and control box.

Referring additionally to FIGS. 5 and 6, it is seen that section 24 has first and second stanchion receiving means in the form of openings 28 (one of which is visible in the figures). These openings are positioned to receive legs 20 each of which is provided with an L-shaped finger 30 that is rigidly coupled therewith and readily received in opening 28. A cleaver edge 32 is provided for each of the legs 20 so as to assure positive gripping of the supporting surface. The length of each leg 20 from finger 30 to cleaver edge 32 should be greater than the distance from opening 28 to the supporting surface. This assures that once the legs 20 assume an upright position framework 14 will be lifted off of truck bed 12.

Section 24 also has a pair of slots 34 in its lowermost edge (one of the slots being visible in FIG. 5) for complementally receiving a pair of apertured plates 36 (one of which is visible in FIG. 5) which are rigid with bumper 26. Each plate 36 has an opening 38 disposed for alignment with a corresponding opening 40 in a plate 42 rigidly coupled with section 24 adjacent slot 34. When section 24 rests upon bumper 26 the openings 38 and 40 will be in alignment to permit insertion of a locking pin 44. On the opposite side of section 24 from slots 34 a pair of rigid blocks 46 are mounted adjacent each leg 20. An appropriate sized opening in each leg 20 and its corresponding block 46 permit insertion of pins 44 for locking the legs in their vertical frame supporting positions.

Base frame 16 also includes a tool box 48 disposed toward the rear end of the frame and rigidly mounted between parallel members 22. Box 48 is covered by a sliding lid 50 which is movable in tracks 52 disposed on the members 22.

Referring now to the forward end of base frame 16 which is best shown in FIGS. 2–4, the first stanchion means 18 comprises spaced apart legs 54 which are interconnected by a horizontal cross bar 56 that is rigid with both of the legs 54. Disposed at the lowermost end of each leg is a rotatably mounted wheel 58. Each leg is also mounted to a respective member 22 by a pivotal coupling 60 one of which is visible in FIG. 2. A short length of rod 62 which is welded to one of the members 22 presents a fixed stop for legs 54 when the latter assume the vertical position as shown in FIG. 3. A movable stop is presented by a sleeve 64 and pin 66 to lock the legs in their vertical position.

Disposed at the forward end of base frame 16 are two roller wheels 68 one of which is visible in FIG. 2. One wheel is mounted at the side of each longitudinally extending member 22 and extends below the lowermost edge of the member to facilitate movement of the framework 14 over the truck bed. Each wheel 68 is preferably of a type that is complemental to a length of track 70 disposed in the bed of the truck beneath the wheel and in parallel alignment with members 22. It should be emphasized, however, that track 70 is optional and in some instances it may be desirable to omit the track and utilize other types of roller means at the forward end of frame 16.

The leading edge of base frame 16 includes a tongue defining plate 72 which projects forwardly from the leading edge of members 22. The tongue 72 extends transversely between members 22 across the width of the truck bed. Tongue 72 also includes a guide groove 74 and an opening 76 for purposes to be made clear hereinafter. At the very forwardmost end of bed 12 a transversely extending plate 78 is disposed in slightly raised relationship to the bed to define a groove 80 for complementally receiving tongue 72. A through bolt 82 extends perpendicular to plate 78 and in alignment with groove 74 to present a guide for assuring proper alignment of base frame 16 with the truck bed. Plate 78 also includes an opening 84 disposed for alignment with opening 76 whereupon a releasable pin 86 may be inserted through the openings to lock the forward end of base frame 16 to the truck bed.

Framework 14 is completed by a wrecker rig implement designated generally by the numeral 88. Wrecker rig 88 is coupled with base frame 16 and includes a boom 90, a power winch 92, and a flexible hangar 94. The power winch 92 is mounted between an upright framework 96 which partially supports boom 90 through cables 98 and also mounts a plurality of signal and warning lights for the vehicle 10. At the side of framework 96 a pair of quick disconnect electrical couplings 100 are mounted which provide means for supplying electrical energy to the power equipment on framework 14. A control box 102 for operating the power winch 92 is preferably disposed in tool box 48.

One side of framework 96 in cooperation with an upright bracket 104 which is rigid with one of the members 22 in spaced relationship to the framework 96 forms a suitable mount for an end gate 106 of the type normally used to close in the bed 12. Thus, end gate 106 may always be carried along with the truck so that if framework 14 is removed the end gate may be returned to its normal position.

Disposed beneath rear bumper 26 and secured thereto is a depending bracket 108 which mounts a conventional ball hitch 110. A flexible line 112 may be coupled with cross bar 56 on the first stanchion means and with the ball hitch 110 to facilitate upright positioning of legs 54 as the vehicle moves away from framework 14.

When vehicle 10 is to be used for carrying cargo framework 14 is left at some suitable location securely supported in the position illustrated in FIG. 3. It will be appreciated that the only modification of bed 12 necessary to accommodate framework 14 is the location of plate 78 at the very forward end of the bed. This plate in no way interferes with any known conventional uses of a pick-up truck. Even when optional tracks 70 are positioned in the bottom of the bed to protect the latter from wear caused by passage of wheels 68 thereover, these relatively flat tracks do not interfere with utilization of the truck for cargo-carrying purposes.

When framework 14 is to be loaded onto bed 12, the vehicle 10 is first aligned with the framework and then moved in the direction of legs 54 until the rear end of the vehicle engages the legs. Lock pin 66 is removed from its sleeve so as to permit pivotal movement of legs 54 about their horizontal axes so as to lower wheels 68 onto tracks 70. In this regard, it is to be noted that the length of legs 54 is such that the wheels 68 are held slightly above the truck bed 12 to allow the latter to be positioned beneath the wheels prior to the rear of the truck engaging legs 54.

As the truck continues to move against legs 54 and in the direction of the second set of legs 20 the first legs 54 are pivoted into their folded position on the truck bed and the forward end of base frame 16 is moved into the truck.

When rear bumper 26 is substantially beneath channel section 24, pins 44 are removed from their respective openings. The vehicle 10 is then moved in the opposite direction, away from legs 20, and abruptly stopped so that the forward momentum of framework 14 will complete loading of it on to the truck bed 12. This is possible as a result of the fact that legs 20 may move from their upright position as shown in FIG. 2 to a second position extending outwardly away from section 24 at an acute angle toward the supporting surface while still remaining coupled with section 24. This second position of legs 20 is indicated in FIG. 6. As this occurs, the rear end of base frame 16 is lowered onto the bed and openings 38 and 40 in plates 36 and 42 respectively are brought into alignment as plates 36 move into slots 34. Pin 44 is then inserted to lock the rear end of the base frame to the vehicle. Legs 20 are then removed from openings 28 and stored on appropriate brackets secured to base members 22. One of these brackets is visible in FIG. 1 and it is designated by the numeral 114.

When framework 14 is to be unloaded from bed 12, legs 20 are first positioned in their inclined positions above described with fingers 30 received in openings 28. As previously mentioned, the cleaver edges 32 of legs 20 facilitate gripping of the supporting surface. Next, pins 44 are removed from aligned openings 38 and 40 and pin 86 at the forward end of the base frame 18 likewise removed. As the vehicle moves in the direction of legs 20, the latter will begin to assume an upright position and in so doing will raise the end of base frame 16 slightly above bed 12. Once legs 20 assume a full upright position as indicated in FIG. 2, pins 44 are inserted in the openings in the legs to lock the latter in their upright positions. The vehicle may now be moved in the opposite direction away from legs 20 as the latter support one end of base frame 16. As the forward end of the framework approaches the rear of the truck bed legs 54 will pivot about their axes downwardly into engagement with the supporting surface. At this point it is desirable to move line 112 over ball hitch 110 so that as forward movement of vehicle 10 continues, legs 54 will be moved into a full upright position. It is possible, however, to move the legs into their full upright position manually without the use of line 112. Once the legs are fully upright, pin 66 is inserted to lock them in this position.

Figure 8:
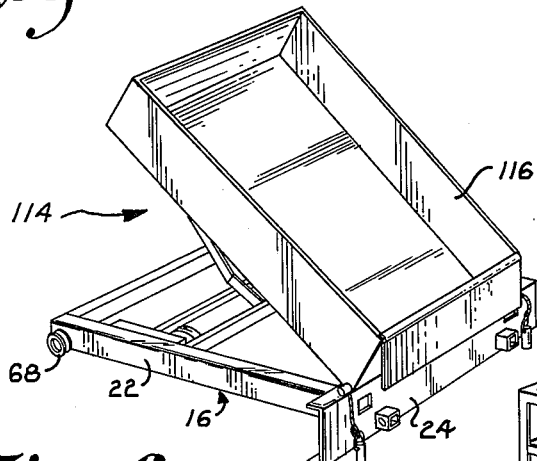
FIG. 8 is a perspective view of an alternative form of the invention wherein a dump bed is disposed on the supporting framework.

An alternative form of the invention has been illustrated in FIG. 8 wherein a framework 114 is shown that comprises a dump bed 116 in combination with and supported upon base frame 16. Framework 114 is movable in and out of truck bed 12 in the same manner as described above for framework 14.

Figure 9:
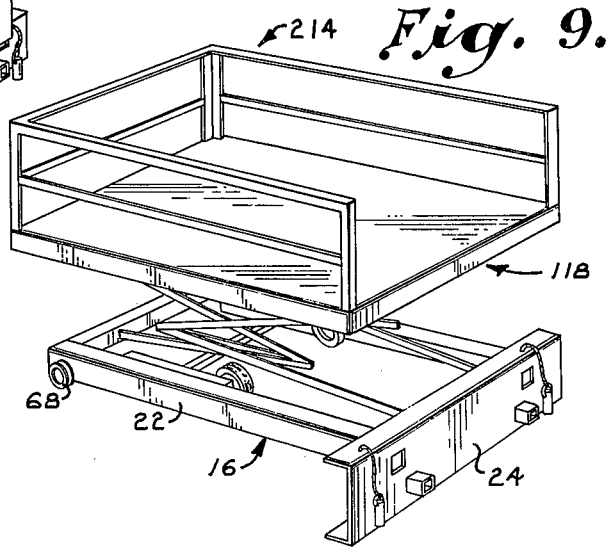
FIG. 9 is a perspective view of still another form of the invention wherein an elevating platform is disposed on the framework.

Still another alternative form of the invention is illustrated in FIG. 9 wherein a framework 214 is shown comprising an elevating platform 118 in combination with base frame 16. Again, movement of framework 214 in and out of bed 12 is identical to that of framework 14 above described. It will be appreciated by those skilled in the art that many other types of implements may be coupled with base frame 16 to convert a flat bed truck into a vehicle having many other functions.

Having thus described the invention, what is described as new and desired to be secured by Letters Patent is:

1. Apparatus for removably mounting an implement on a flat bed of a truck type vehicle normally used for carrying cargo, without interfering with the cargo-carrying capacity of the vehicle, and capable of being installed and removed by a single operator, said apparatus comprising:
a base frame adapted to be moved across and positioned on said bed and coupled to said vehicle for supporting said implement in a working position on the bed;
first stanchion means pivotally coupled with said frame toward the forward end thereof and movable, when said frame has been partially removed from said bed, from a folded position adjacent the frame to a ground engaging position for supporting said frame; and
second stanchion means adapted to be coupled with the frame toward the rear thereof in spaced relationship to said first stanchion means and adapted to engage the ground and operable to raise the rear portion of the frame off the bed in response to movement of the vehicle in one direction to support the frame in said raised position.

2. The invention of claim 1, wherein said first stanchion means comprises spaced apart legs, each leg having ground-engaging roller means at one end and the legs being positioned for engagement by the rear of said vehicle whereby when the vehicle moves against the legs the latter will move from their ground-engaging position to their folded position.

3. The invention of claim 1, wherein said second stanchion means comprises spaced apart legs, each leg having ground-engaging cleaver means at one end.

4. The invention of claim 1, wherein said base frame comprises a polygonal body; said first stanchion means comprises spaced apart legs, each leg having ground-engaging roller means at one end and the legs being positioned for engagement by the rear of said vehicle whereby when the vehicle moves against the legs the latter will move from their ground-engaging position to their stored position; said polygonal body having one side thereof disposed at the rear of the vehicle, there being spaced apart leg-receiving means coupled with said one side; and said second stanchion means comprising spaced apart legs, each leg having ground-engaging cleaver means at one end and including means adapted to be received by one of said leg-receiving means when the leg is disposed at an acute angle relative to the horizontal, each leg being further adapted to be moved into a vertical position while remaining engaged with the leg-receiving means in response to movement of the vehicle in said one direction to thereby raise said frame off the bed.

5. The invention of claim 4, wherein is included means for releasably locking each leg of the second stanchion means in its vertical position.

6. The invention of claim 5, wherein is included first means for releasably coupling said frame to said vehicle at the front end of the bed and second means for releasably coupling the frame to the vehicle at the rear of said bed.

7. The invention of claim 6, wherein said first coupling means comprises structure defining a groove at the forward end of said bed and a complemental tongue at the forward end of said frame.

8. The invention of claim 6, wherein said vehicle includes a bumper at the rear of said bed, said bumper being located at a height below the level of said bed, said one side having an edge disposed on said bumper when the frame is on the bed, and the second coupling means comprising complemental components on said bumper and said one side respectively.

9. The invention of claim 4, wherein is included roller means coupled with said frame at the forward end of the latter and positioned for engagement with said bed to facilitate movement of the frame over the bed.

10. The invention of claim 9, wherein is included first and second spaced apart tracks for disposition on said bed, said roller means comprising first and second wheels positioned on the frame for alignment with said tracks.

11. The invention of claim 1, wherein said implement comprises a wrecker rig for towing a vehicle.

12. The invention of claim 1, wherein said implement comprises a dump bed.

13. The invention of claim 1, wherein said implement comprises an elevating platform.

14. A method of removing an implement-carrying frame from the bed of a truck-type vehicle and placing said frame on the vehicle-supporting surface, where the frame has a side extending transversely of the rear of the bed and said side comprises stanchion-receiving means, and stanchion means, each having a length greater than the distance from said stanchion-receiving means to said surface, said method comprising the steps of:

coupling said stanchion means with said stanchion-receiving means, with said legs disposed at an acute angle relative to said surface and extending outwardly from said frame in the direction of said surface;

moving said vehicle in the direction of said stanchion means whereby to cause the stanchion means to assume a vertical position and thereby lift the frame from the bed;

locking said frame to said stanchion means after the latter are in their vertical positions;

moving said vehicle in the opposite direction to which it first was moved to thereby pull said frame off of said bed;

vertically supporting said frame at a point spaced from said stanchion means in the direction of said vehicle prior to the frame being completely pulled from the bed of the vehicle, whereby as the vehicle continues to move in said opposite direction said frame will be completely pulled from said bed and supported independently therefrom.

15. A method of loading an implement-carrying frame onto the flat bed of a truck type vehicle, when the frame is initially supported on the same surface as the vehicle at a height above the height of the bed by a first foldable stanchion means disposed toward the front end of said frame and second stanchion means spaced rearwardly of the first stanchion means and adapted to be rigidly coupled with said frame when in a vertical position and movable into a second position while remaining coupled with said frame to extend outwardly therefrom toward said surface at an acute angle, said method comprising the steps of:

moving said vehicle in the direction of said frame to position the bed under the forward edge of the frame;

continuing movement of said vehicle against said first stanchion means to move the latter from its frame supporting position to a folded position resting on said bed;

further moving said vehicle in the direction of said second stanchion means until the rear end of said bed is disposed adjacent said second stanchion means;

removing the rigid coupling between said frame and said second stanchion means;

moving said vehicle in the opposite direction from said second stanchion means to move the latter into said second position; and abruptly stopping said vehicle so as to provide a forward momentum to said frame adequate to complete loading of the frame onto the bed of said vehicle.

16. The invention of claim 15, wherein is included the step of uncoupling said second stanchion means from said frame.

17. The invention of claim 16, wherein is included the step of coupling said frame with said vehicle.

* * * * *